May 20, 1941. E. H. YONKERS, JR 2,242,278
SUCTION CLEANER
Filed April 19, 1940 2 Sheets-Sheet 1
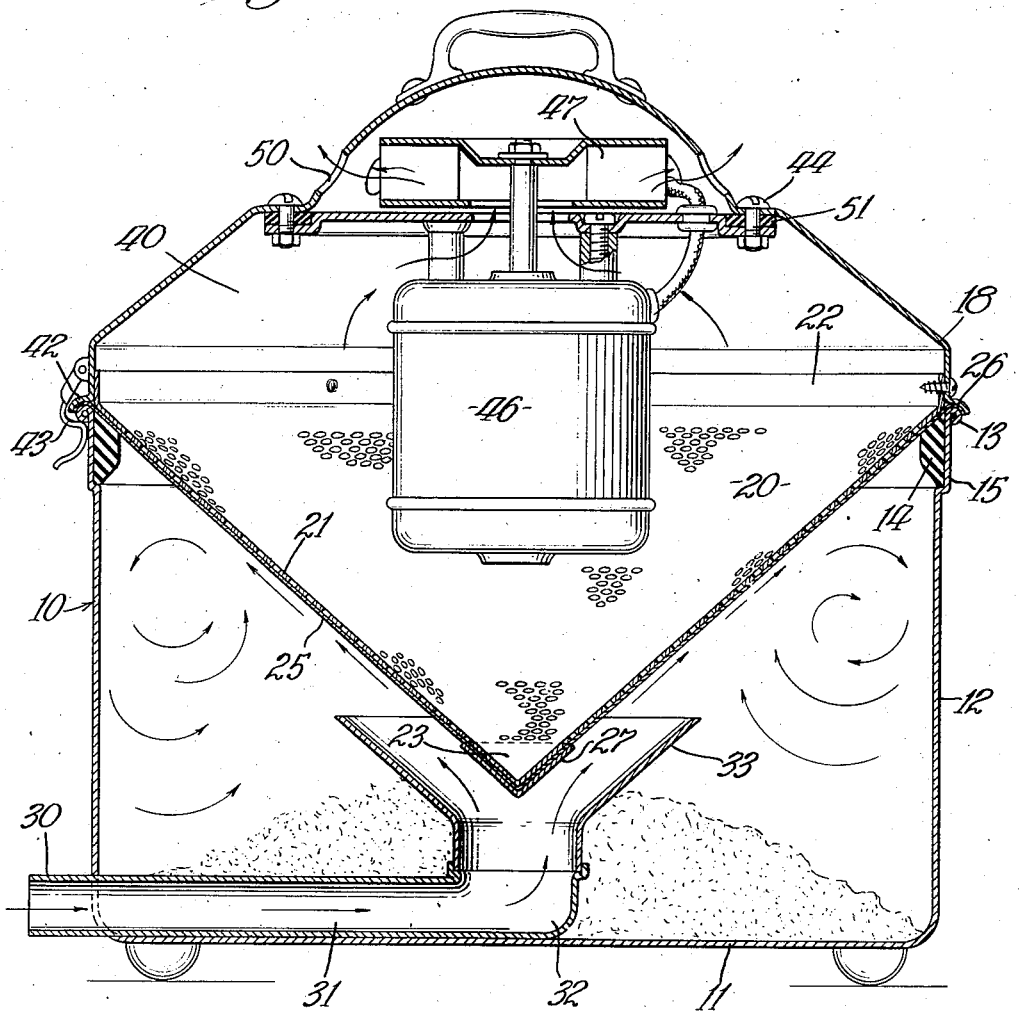

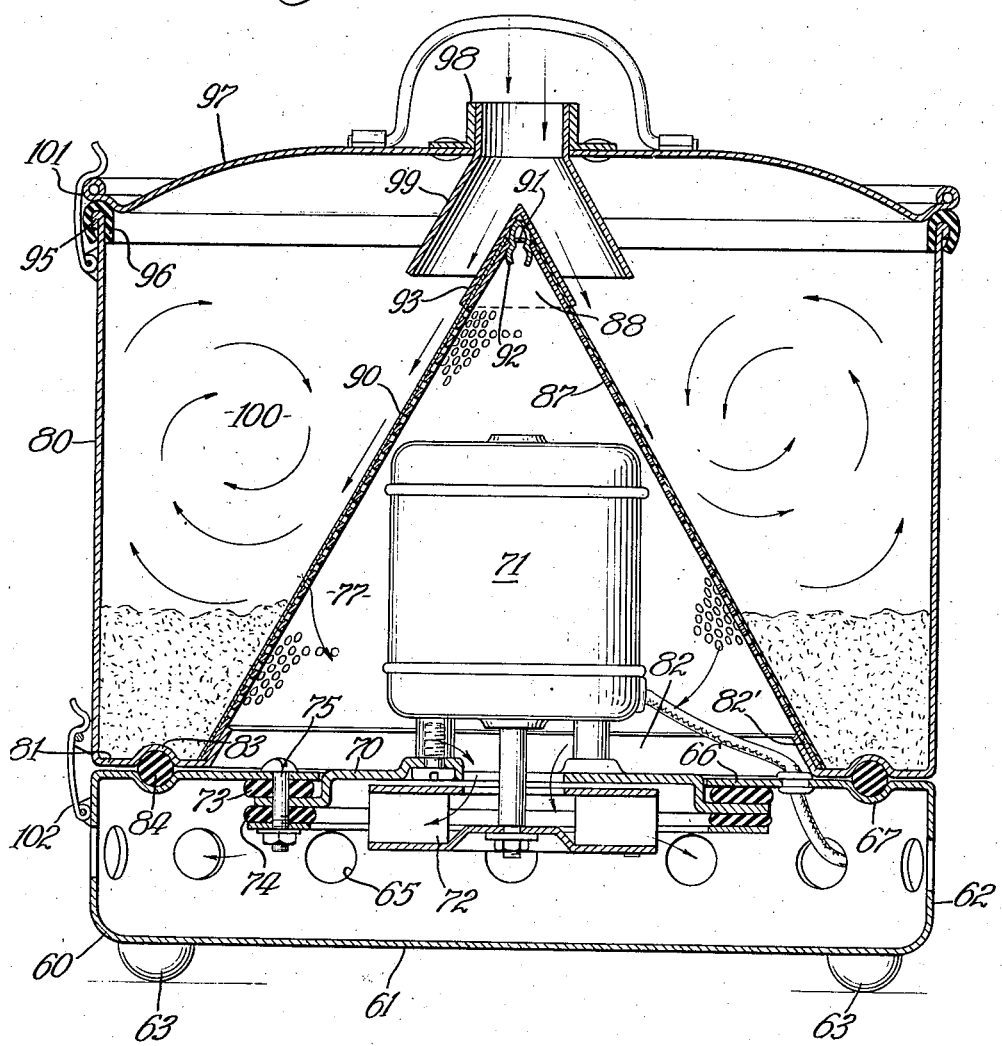

Patented May 20, 1941

2,242,278

UNITED STATES PATENT OFFICE 2,242,278

SUCTION CLEANER

Edward H. Yonkers, Jr., Glencoe, Ill.

Application April 19, 1940, Serial No. 330,572

14 Claims. (Cl. 183—37)

This invention relates to suction cleaners of the type having a readily removable filtering element, such as of paper or the like.

In the design of a cleaner of this type, two main problems present themselves. One involves the area of the filtering element and the other involves the mechanical interaction of dirt in the cleaner and the filter surface. To a certain extent, both problems are interwoven and should be considered together.

Thus it is desirable to have as large a surface area of the filter as possible. The suction pressures obtainable are low and are of the order of several inches of water, with air going through a clean filter surface. Hence a large filter surface tends to reduce the flow resistance, all other factors being the same. Thus a large volume of air may be moved with the same equipment.

The interaction of the dirt in the cleaner and the filter surface is highly important. In the so-called bag filter, the dirt-laden air blast is released inside of a porous bag. The bag functions as both filtering medium to separate the dirt from the air and as a container for the collected dirt. The very act of filtering causes dirt to be blown against the filter surface and the greater the quantity of dirt, the greater the resistance offered by the filter to the flow of air. Hence in a filter of this type, a large area merely means a greater capacity for dirt storage. Although the flow resistance of a large bag is smaller than a small bag, the difference becomes smaller as dirt accumulates in both until the resistance of both become equally high and prevent any substantial flow of air therethrough.

In a bag type of filter, the lack of control over the dirt-laden stream precludes the use of fragile filter members, such as of paper, unless of course very heavy and strong paper is used. The dirt-laden air stream is discharged into the bag at a high velocity, if any substantial flow of air exists. Hence dirt particles entrained in the high velocity air stream are projected forward at high velocity and would tear and mutilate any fragile filter.

In the invention disclosed herein these objections have been overcome to a remarkable degree. The filter element may be of paper having any suitable porosity. Thus the paper disclosed and claimed in United States Patent No. 2,045,096 granted on June 23, 1936, and marketed under the name "Dextilose" is particularly desirable. This is a light paper having long fibers in all directions matted together with fine pores therethrough and has an unusual degree of porosity. If desired the paper may have the low pressure face treated by applying a cellulose binder to provide a smooth surface free of projecting cellulose fibers. The solvent will stick all fibers down against the paper but should be thin enough so that the pores will not be filled.

The filter area though compact is large by shaping the paper into a generally conical form. To maintain the shape intact, a suitable perforated rigid backing member is provided. The dirt-laden air stream is conducted to or near the tip of the cone filter and initially directed along the conical sides toward the base of the cone. The blast is released preferably near enough to the paper surface so that the air and entrained dirt grazes the paper surface and thus a scrubbing action on the paper occurs.

Because the incoming volume of air is small in comparison to the volume of air usually present in the cleaner as a whole, the high velocity of both the incoming air and incoming dirt is quickly dissipated after release from the nozzle inside the cleaner. Hence further control over the dirt, after loss of velocity, becomes unimportant as far as impact on the paper is concerned. However, it is desirable to remove the dirt from the filter surface against any tendency of the suction at the paper surface to retain it there. By mounting the filter surface in a suitable fashion so that gravity acts in a different direction from all or most of the suction components at the filter surface, it is possible to keep the dirt separated from the air sucked through the paper. The dirt is thus utilized to some degree to scour the filter surface and dislodge any other dirt that might tend to adhere otherwise.

A fragile filter surface of any desired area may be utilized and operated at maximum efficiency without danger of puncturing by impact and without having the dirt content of the cleaner forced up against the filter surface and maintained there during cleaner operation, as is true of present day cleaners.

A generally conical filter is preferred for the reason that the dirt-laden air may be discharged right at the paper surface and parallel thereto to travel down the straight conical elements. However, a hemi-spherical contour is possible in which case the scouring action may be less efficient. The cone tip may be eliminated if desired. Pyramidal filters are also possible. These modifications are considered to be within the scope of the term "generally conical" as used herein.

Referring to the drawings,

Figure 1 is a sectional elevation of a suction cleaner;

Fig. 2 is a detail of the top of the filter unit; and

Fig. 3 is a sectional elevation of a modified form of cleaner.

The construction shown in Figs. 1 and 2 includes a preferably cylindrical dust pan 10 having a bottom 11 with side wall 12. Wall 12 terminates in beaded edge 13.

Disposed around the inside edge of wall 12 is a gasket 14 of rubber or similar material. This gasket may rest in an offset portion 15 of the pan wall or may be supported in any desired manner.

Resting on beaded edge 13 is a cover 18, to be described in detail later and carrying a generally conical filter unit 20. This unit consists of a perforated rigid backing member 21 with a base flange 22 fastened to cover 18 by screws. Backing member 21 is of any suitable material such as sheet metal, plastic, or stiff woven wire and has a tip portion 23 which is preferably solid.

Disposed against the lower face of backing member 21 is a fragile filtering member 25 of paper or other suitable material. As previously pointed out, paper is preferred and the kind of paper sold under the name Dextilose has been found satisfactory. The paper filter is shaped to fit snugly against backing member 21. The edge 26 of the paper preferably extends around beaded edge 13 of the pan.

Paper filter 25 has its tip portion 27 preferably reinforced with heavy paper or other material, the tip portions 23 and 27 being about the same size. It is possible to dispense with either the reinforced filter tip or with the absence of perforations in the backing member, although the preferred construction is as shown.

Dust pan 10 has an inlet 30 for supplying dirt-laden air. This inlet may be connected to any suitable hose and cleaning tool. Inlet 30 comprises a circular pipe section 31 coming into the pan along bottom 11 and an elbow 32 terminating in a flaring nozzle 33. Nozzle 33 is preferably concentric with the tip of the generally conical filtering unit. The nozzle 33 preferably begins somewhat below the cone tip and extends generally parallel to the filter surface for a distance. The distance between the nozzle and filter surface, precise location and length of nozzle and length of cone tip 23 are matters of individual choice and depend upon various engineering factors.

The non-porous tip of the filter element together with nozzle 33 function as an annular nozzle to discharge the dirt-laden air stream at the filter surface and parallel thereto. Because of possible impact on the cone tip, the means disclosed here have been provided for preventing tearing of the fragile filter element.

It is clear that parallelism between nozzle 33 and cone tip 23 is not important. As long as the air blast is discharged at the paper surface and along the extent thereof, the precise nozzle details are unimportant.

It is understood that nozzle 33 and intake 30 in general are made of suitable material such as sheet steel or aluminum. The reinforced tip 27 of the filter element may be of kraft paper cemented over the filter paper proper, or thin fabric.

Above the conical filter element or on the low pressure side thereof is a low pressure region generally designated by 40. This region is enclosed by cover 18 and leakage of air from outside is prevented by a curved lip 42 overlying paper edge 26 and beaded edge 13. If desired, a gasket may be provided. It is clear that when cover 18 is lifted from pan 10, that paper filter 25 will be retained in place by its curved edge 26. Any other means for retaining the paper may be provided if desired. In fact, a paper rest may be provided in the center of pan bottom 11 by having a post extend up from the pan center to terminate in a metal cone fitting the paper cone tip 27. In this way, the tip of the paper may be protected, instead of by eliminating the holes in the backing tip 23 and/or providing reinforced paper tip 27.

To lock cover 18 on pan 10, clasps 43 may be provided. Supported within cover 18 by bolts 44 is a motor 46 and blower 47 of any suitable construction. The blower discharges air through vents 50. A gasket 51 seals the motor mounting and prevents air from leaking into the low pressure chamber. As is evident from the drawings, the air from the low pressure chamber passes up beyond the motor and through the blower.

When the suction generating means is in operation, dirt-laden air is discharged into the dust pan. The dirt-laden air follows the filter surface and approaches the pan wall. The general flow of air is such as to form an annular doughnut-shaped region with the air at any cross section whirling around as shown by the arrows.

Dirt particles having substantial mass are discharged from the nozzle generally parallel to the filter surface. Such particles quickly lose velocity and tend to fall to the pan bottom in spite of the doughnut-shaped whirling region. Lighter dirt particles are whirled around to some extent but centrifugal force tends to throw them down to the pan bottom. The pan itself may be deep enough so that the bottom region is more or less quiet.

It is understood, of course, that the diameter of the pan may be much greater than the diameter of the cone base (assuming that the cross sections are circular for example) so that no air pocket adjacent gasket 14 is formed. In this way the whirling doughnut-shaped region will not be so well defined or may be eliminated entirely if desired.

Referring to Fig. 3, a base 60 having a bottom 61 and upstanding wall 62 is adapted to rest on feet 63. Base 60 is preferably round and has a plurality of discharge apertures 65 in the wall. At the top of wall 62, the base material, sheet steel or any other suitable material, extends inwardly to form an annular supporting ledge 66. At a portion of the ledge, an indentation or channel 67 is formed and this extends around in a circle, looking down upon the cleaner.

Supported from ledge 66 is a mounting plate 70 carrying a motor 71 and blower 72. Plate 72 is disposed between two sealing gaskets 73 and 74 and the entire assembly retained in position by bolts 75.

As is evident from the drawings, air around the motor is taken in by blower 72 passing through an aperture in mounting plate 70 and discharged inside of base 60. The region inside of base 60 may be considered as the outside atmosphere, as far as cleaner operation is concerned. Region 77 around the motor 71 may be considered as a low pressure region.

Mounted upon base 60 and readily removable therefrom is a dust pan and filter assembly. This assembly comprises pan 80 having an annular bottom 81, whose inner edge 82 is bent upwardly to form a flange. Bottom 81 has an indentation or channel 83 opposite a channel 67 and together the two channels form a generally circular channel within which a ring gasket 84 is disposed. It will be noted that gasket 84 is thick enough so that the opposing metal surfaces are spaced slightly from each other so that an air seal is formed.

Carried by flange 82 is a generally cone shaped backing member 87 and, like backing member 21 in Fig. 1, it is perforated and rigid enough to withstand suction pressures. The tip portion 88 of the backing member may be solid. Lying over backing member 87 is a fragile filter element 90, preferably of paper as previously described. This paper filter extends down far enough to overlie the solid, unperforated portion 82' of the backing member at flange 82 and forms a tight seal. It will be noted that backing member 87 has an opening 91 extending at the extreme tip. Through this opening, a spring clip 92 carried by a rigid cone hood 93 may be snapped. Hood 93, like reinforced tip 27 in Fig. 1, fits over the fragile paper and protects the same. The size of hood 93 may vary within wide limits. It is understood that in snapping the hood down, that spring clip 92 will puncture the paper tip. However, the paper will be pulled by suction pressure against the backing member to seal the filter, in addition to the hood pressing the paper against the backing member.

Pan 80 has a doubled edge 95 and over this edge is fitted a gasket 96. A cover 97 is fitted over the entire device. This cover has an intake 98 terminating in a generally conical nozzle 99 for supplying dirt-laden air. Inasmuch as the general relations between nozzle 99, hood 93 and filter paper 90 are the same as the corresponding elements in Fig. 1, no further description will be necessary. The high pressure region 100 within the dust pan 80 has air currents as shown by the arrows, although as pointed out in connection with Fig. 1, these may be reduced or eliminated by altering the relative proportions of dust pan and filter element.

Clasps 101 and 102 are provided for holding the various parts together. When it is desired to empty the dust compartment, the dust and filter assembly may be detached from base 60. Then cover 97 removed and the dust emptied out.

By having the spring retained hood 93, the paper filter is prevented from falling out during the dust emptying step. If desired, a reinforced paper filter, such as in Fig. 1, may be used either without any paper retaining means or simply with spring clips at the base portion of the backing member pressing the paper against the backing member and preventing the paper from falling out. It is also possible to use the spring retained hood in the construction of Fig. 1. The hood itself may be of metal, plastic, stiff paper or the like.

What is claimed is:

1. A suction cleaner comprising a receptacle, a generally conical filtering assembly supported by said receptacle and together therewith forming a dust compartment, said assembly including a fragile filter and a rigid perforated backing member, means for generating a suction to pull air from said compartment through said filter assembly, and a tubular intake for said compartment to supply dirt-laden air, said intake terminating adjacent to and symmetrically with the cone tip and discharging the air blast adjacent and generally parallel to the cone sides.

2. The structure of claim 1 wherein said intake terminates in a nozzle at the filter surface to discharge the air along the surface of the filter whereby a cleaning action is obtained.

3. A suction cleaner comprising a generally cylindrical receptacle having a vertical axis, a generally conical filter assembly disposed in generally symmetrical relation thereto and together therewith forming a dust compartment, said filter assembly having its base large enough so that the edge is adjacent the receptacle wall, said assembly including a fragile filter element and a rigid perforated backing member, means for generating a suction to pull air from said compartment through said filter assembly and a tubular intake for said compartment for supplying dirt-laden air thereto, said intake terminating adjacent to and symmetrically with the cone tip and discharging the air blast adjacent and generally parallel to the cone sides.

4. A suction cleaner comprising a receptacle, a generally conical filtering assembly supported by said receptacle and together therewith forming a dust compartment, the cone axis being vertical, said assembly including a fragile filter element and a rigid perforated backing member, means for generating a suction to pull air from said compartment through said filter, and an intake for said compartment for supplying dirt-laden air thereto, said intake terminating in a nozzle adjacent the cone tip, said nozzle having as one guiding wall a generally conical portion congruent with the tip portion of the filter assembly, directing the air blast along the surface of the filter from the tip toward the base.

5. The construction of claim 4 wherein another guiding wall is the tip part of the fragile filter element so that the air blast is discharged at the filter surface.

6. The construction of claim 4 wherein another guiding wall is the tip part of the fragile filter element with said tip being non-porous to air and sufficiently strong to withstand impact of dirt thereon.

7. In a suction cleaner, a generally conical filter element consisting of porous paper, said paper being fragile enough to be torn by direct impact of dirt in a suction stream and having a tip portion of heavy non-porous material.

8. A suction cleaner comprising a dust container having an open top, a generally conical filter assembly closing said top and extending down into said container, said assembly comprising a porous paper and a rigid perforated backing member to prevent collapse of said paper, means above said filter assembly for generating a suction, and an air intake for said compartment, said intake having means for discharging the air at one end of the cone generally parallel to the cone side toward the other end thereof.

9. The cleaner of claim 8 wherein said intake has a discharge nozzle near the apex of the cone.

10. In a suction cleaner, a base, a removable assembly on said base comprising dust filtering and storage means, said assembly including a dust pan having an open bottom and a rigid perforated backing member rising from said bottom interiorly of said pan, a paper filter covering the surface of said perforated member within said pan interior, means on said base for sucking air from said pan interior through said filter, and means for supplying dirt-laden air to said pan.

11. The structure of claim 10 wherein said filter wall has linear elements and wherein said air supplying means directs the blast along the filter linear elements.

12. In a suction cleaner, a filtering element consisting of a generally conical rigid perforated backing member and a fragile paper filter supported thereby, means for supplying dirt-laden air parallel to said filter surface, and positive means for retaining said paper filter on said backing member, said positive means including a cone hood having a spring catch, said backing member having its extreme tip open to receive said catch with the catch going through the paper tip.

13. The structure of claim 10 wherein said rigid perforated backing member has a generally conical shape with a solid annular bottom region bordering said rising portion to form a resting place for dust.

14. The structure of claim 10 wherein said assembly has a removable cover on top thereof, said cover having a centrally disposed nozzle as the means for supplying dirt-laden air and wherein said filter wall has a generally conical shape with the apex symmetrical with said nozzle, and wherein means are provided for directing the dirt-laden air blast along the cone sides.

EDWARD H. YONKERS, Jr.